United States Patent [19]
Parker

[11] Patent Number: 5,945,045
[45] Date of Patent: Aug. 31, 1999

[54] CONTROL FOR PLASTIC SHOT VOLUME FOR A HIGH SPEED PLASTIC INJECTION MOLDING MACHINE

[76] Inventor: John C. Parker, 9010 Old Hickory Rd., Tyler, Tex. 75703

[21] Appl. No.: 08/912,114

[22] Filed: Aug. 15, 1997

[51] Int. Cl.⁶ ................................................. B29C 45/82
[52] U.S. Cl. ..................... 264/40.1; 264/328.1; 425/145; 425/586
[58] Field of Search .................. 264/40.1, 40.5, 264/40.4, 328.1, 328.19; 425/135, 140, 145, 146, 147, 150, 155, 159, 586, 558; 414/46, 401

[56] References Cited

U.S. PATENT DOCUMENTS

| | | | |
|---|---|---|---|
| 3,907,952 | 9/1975 | Cleereman | 264/40.5 |
| 3,985,486 | 10/1976 | Hendry | 425/564 |
| 4,067,673 | 1/1978 | Hendry | 425/557 |
| 4,090,836 | 5/1978 | Von Der Ohe et al. | 425/574 |
| 4,655,633 | 4/1987 | Somero et al. | 425/60 |
| 4,712,991 | 12/1987 | Hehl | 264/40.5 |
| 5,018,950 | 5/1991 | Reinhart | 425/145 |
| 5,123,833 | 6/1992 | Parker | 425/561 |
| 5,325,668 | 7/1994 | Walchhutter et al. | 264/40.5 |
| 5,445,773 | 8/1995 | Arai | 264/40.1 |
| 5,554,326 | 9/1996 | Nakazawa et al. | 264/40.1 |
| 5,554,327 | 9/1996 | Ingram et al. | 264/40.5 |

*Primary Examiner*—Jill L. Heitbrink
*Attorney, Agent, or Firm*—Crutsinger & Booth

[57] ABSTRACT

In a high speed injection molding machine the injection "shot" size is controlled by driving the injection piston by an injection cylinder activated by a precisely known predetermined volume of hydraulic fluid thereby precisely limiting the travel distance of the injection piston during the injection process.

9 Claims, 1 Drawing Sheet

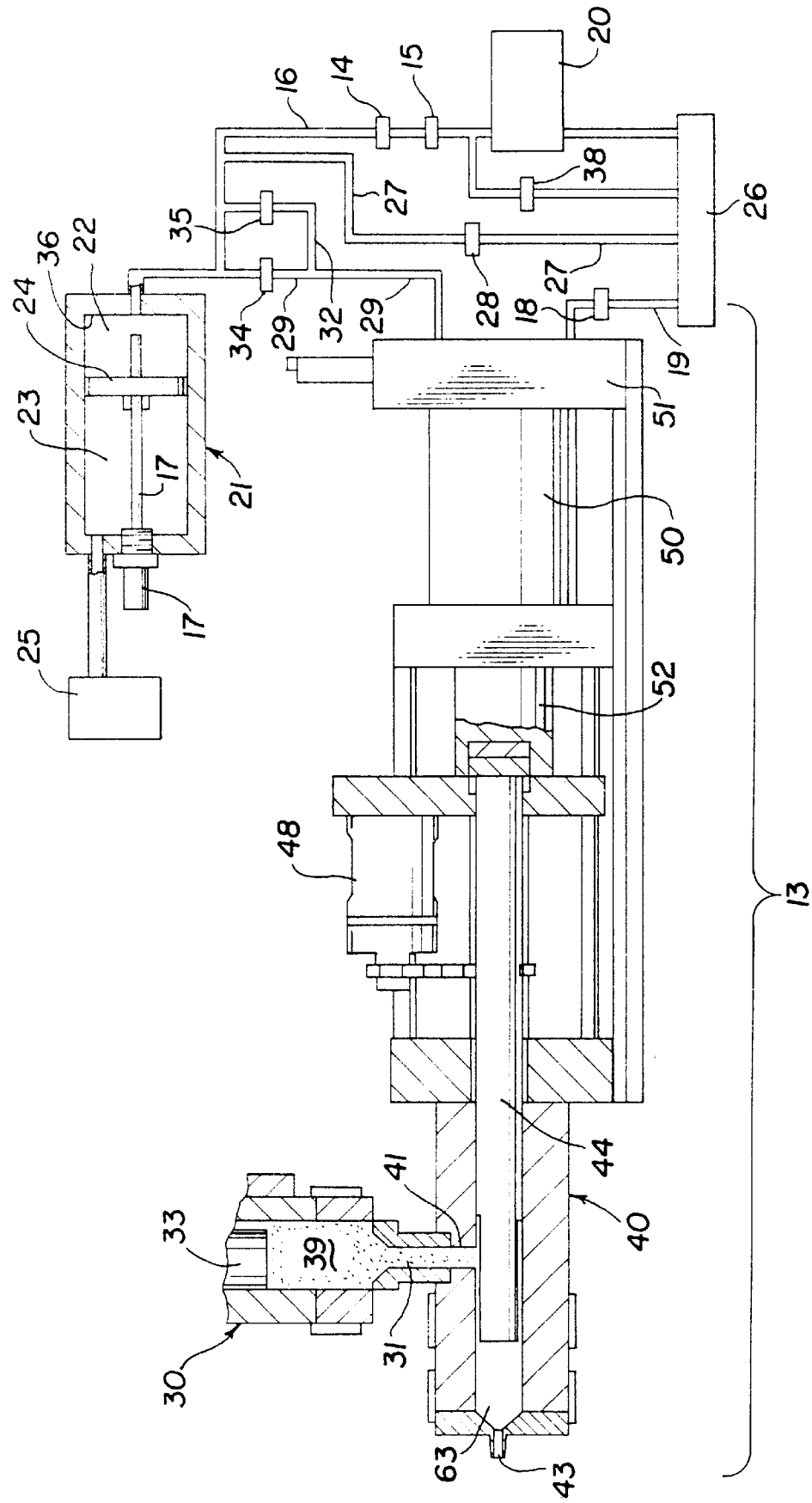

CONTROL FOR PLASTIC SHOT VOLUME FOR A HIGH SPEED PLASTIC INJECTION MOLDING MACHINE

TECHNICAL FIELD

The present invention relates to high speed injection molding machines for the manufacture of plastic articles and more particularly to a means for accurately controlling the "shot" size repeatability at very fast injection rates for high speed injection molding machines.

BACKGROUND OF INVENTION

Prior to the present invention various means were used to control the amount of plastic (shot size) injected into the mold during each cycle of an injection molding machine. For example, in the system shown in U.S. Pat. No. 3,767,339 issued to D. B. Hunkar the ram velocity is controlled as a function of the position of the ram in order to control the injection rate of plastic and thus the total volume of plastic injected during the cycle.

In U.S. Pat. No. 3,797,808 issued to W. Y. Ma, et al there is shown a system for controlling the shot size and plastication time in an injection molding machine. This system includes a computer for calculating screw speed based on previous cycle operation conditions in order to control a plastication time to a predetermined value. Additionally, the back pressure on the rotating screw is controlled to maintain the melt temperature of the plastic and thus the amount of plastic injected into the mold to a predetermined value.

In the machine of U.S. Pat. No. 3,932,083 issued to J. E. Boettner the position of the ram is monitored at a certain time after the start of the injection cycle and the injection pressure is adjusted, if needed, to compensate for the viscosity of the melt. After fill the mold pressure is monitored and additional pressure applied as needed to complete the fill.

The above noted control systems are much less accurate and efficient when used at high speed injection rates.

In another prior art system designed for high speed operation hydraulic oil is pumped into a piston-type accumulator against a volume of dry nitrogen pre-charged to a known pressure. For injection the hydraulic oil is released through a valve into the injection cylinder. The stroke of the injection piston or the injector rod is measured by a linear displacement transducer. When the desired stroke, i.e. injected volume, is reached the valve between the accumulator and the injector cylinder is automatically closed. As the speed of this system was increased its repeatability decreased. At very high injection rates the inaccuracies of the last described system produced unacceptable rejection rates.

SUMMARY OF INVENTION

In the system of the present invention, hydraulic oil is pumped at a relatively slow rate into a piston type hydraulic cylinder accumulator against the piston in the accumulator backed by a pressurized volume of dry nitrogen as before. During the pumping the position of the accumulator piston is monitored by a linear position transducer. When a predetermined volume of hydraulic fluid is stored in the accumulator as indicated by the accumulator piston position, fluid input to the accumulator is shut off. When the injection cylinder has been charged with a sufficient amount of plasticized material the stored accurately measured volume of hydraulic fluid under high pressure in the accumulator is released at a high rate into the injection cylinder behind the injection piston. The hydraulic accumulator piston, under the pressure of the gas on its back side, ejects all of the hydraulic fluid from the accumulator cylinder into the injection cylinder, thus producing a precise and accurately known stroke length of the injection piston. The result is that a precise and accurately known amount of plasticized material is forced from the injection cylinder into the mold.

Further objects and features of the invention will be found from the following detailed description of the invention when read with reference to the accompanying drawing.

BRIEF DESCRIPTION OF THE DRAWING

The sole FIGURE illustrates diagrammatically a side elevation view, partly in section, of the injection section of a molding machine embodying the high speed injection control of the present invention.

DETAILED DESCRIPTION OF THE INVENTION

With reference now to the FIGURE there is shown diagrammatically a side elevation view, partly in section, of a high speed injection molding machine of the current type such as that shown in U.S. Pat. No. 5,123,833 issued Jun. 23, 1992 to John C. Parker, the inventor of the present invention. The disclosure and specification of the referenced U.S. Pat. No. 5,123,833 are hereby incorporated in total herein by reference.

Also shown in the FIGURE diagrammatically in side elevation and partly in section is the control system of the present invention to provide a precise volume of plastic molding material or "shot charge" to fill the mold precisely in each injection cycle even at extremely high injection rates.

Briefly, in the injector section of the molding machine designated generally as 13 a plastic accumulator cylinder 30 includes a plastic accumulator chamber 39 and a plunger, a portion of which is shown as 33. Cylinder 30 has an outlet passage 31 leading from chamber 39 to injection chamber 63 of injection cylinder 40. Piston 44 is reciprocated in the injection cylinder 40 by rod 52 of hydraulic injector cylinder 50. As plasticized material that has been fed into accumulator chamber 39 from a plasticizer (not shown) is forced into the injection chamber 63 by downward movement of accumulator plunger 33, injection piston 44 is pushed back (to the right in the drawing). Plasticized material is forced into the injection chamber 63 until there is at least enough for a full mold injection at which time a rotary valve actuator 48 rotates piston 44 to close the inlet port 41, as fully explained in the aforementioned U.S. Pat. No. 5,123,833. Thereafter hydraulic fluid under very high pressure is admitted to the injector cylinder 50 through manifold 51 to drive injection piston 44 forward and eject the plasticized material in chamber 63 through nozzle 43 into the mold.

In many prior art systems the amount of plasticized material injected into the mold was controlled by attempting to insert a precise volume of plasticized material into chamber 63 as measured by movement of either plunger 33 or injection piston 44. However, for really high speed injection a more precise means of determining the volume or "shot size" of material injected is required.

In the present invention the "shot size" is controlled by precisely controlling the volume of high pressure hydraulic fluid used to actuate the injector. To provide a precise volume of high pressure fluid a hydraulic pump 20 is used to charge a hydraulic accumulator cylinder 21 with fluid. The hydraulic fluid is pumped into chamber 22. Gas chamber 23 contains a neutral gas, nitrogen for example, under high pressure supplied from a gas source 25. A pre-charged gas pressure of 1800 psi in chamber 23 has been found suitable. The pumping of hydraulic fluid into chamber 22 forces piston 24 towards the gas chamber 23 further compressing the gas in the chamber. When a precisely known volume of hydraulic fluid has been pumped into chamber 22 against the pressure of the gas in chamber 23 input from the pump is stopped. The precisely known volume of fluid is held in chamber 22. The fluid from chamber 22 is then admitted to the injection cylinder 50. Under the high pressure impetus of the fluid from the accumulator 21 rod 52 pushes the injection piston into cylinder 40 at a high speed ejecting the plasticized material in chamber 63 through nozzle 43 into the mold.

The following details the injection process through a typical full cycle of the operation of an injection molding machine using the present invention. Under "initial" conditions, nitrogen gas from gas source 25 is admitted to chamber 23 to a pressure of 1800 psi. The pressurized gas forces piston 24 to the opposite end of cylinder 21 pushing any hydraulic fluid in chamber 22 out of that chamber and back into the hydraulic fluid reservoir 26 through fluid line 27 and accumulator drain valve 28.

At the same time plunger 33 is advanced pushing plasticized material from the plastic accumulator chamber 39 out through passage 31 and into the injection chamber 63 through outlet port 41. As the plasticized material enters chamber 63 piston 44 and rod 52 are moved to the right as illustrated in the FIGURE. The movement of rod 52 forces hydraulic fluid from injector cylinder 50 through manifold 51 and drain valve 18 in drain line 19 back into the fluid reservoir 26.

With drain valves 18 and 28 closed accumulator charge valve 14 is then opened to allow a measured volume of hydraulic fluid from reservoir 26 to be pumped through check valve 15 and line 16 into chamber 22 of the hydraulic accumulator cylinder 21 by pump 20.

The volume of fluid pumped into chamber 22 may be controlled to the desired amount by using a fixed displacement pump as pump 20 and opening valve 14 for a timed period depending on the desired fluid charge volume. A more accurate and preferred means for gauging the fluid volume input to chamber 22 is by use of a linear position transducer 17 on and in accumulator cylinder 21 to detect the movement and position of piston 24 within the cylinder. A linear positioned transducer suitable for use in the present invention is the Temprosonics L.H. available from MTS Systems Corp. 3001 Sheldon Drive, Cary, N.C. 27513.

When the hydraulic fluid in chamber 22 reaches a prescribed volume charge, valve 14 is closed to stop flow into the accumulator 21. For high speed injection of plastic from chamber 63 into the mold through nozzle 43 a pilot operated fast injection valve 34 and slow injection valve 35 are both open to admit the hydraulic fluid under 1800+ psi plus pressure from chamber 22 of hydraulic accumulator cylinder 21 to injector cylinder 50 through lines 29 and 32 and manifold 51.

When piston 24 reaches the end wall 36 of chamber 22 a known exact volume of hydraulic fluid will have been inserted into injector cylinder 50 pushing piston 44, attached to rod 52, a known exact distance into the injection chamber 63. The movement of piston 44 through an exact distance will eject an exact volume of plastic from chamber 63 into the mold through nozzle 43.

As the piston 24 nears the end of its stroke at the end wall 36 of cylinder 21 the fast injection valve 34 is closed but the slow injection valve 35 is held open to the end of the piston stroke when piston 24 contacts the end wall 36 to allow for "final fill." After piston 24 contacts the end wall 36 of cylinder 21 at the end of the stroke valve 35 is closed and drain valves 18, 28 and 38 are opened to allow drainage of the system before the next cycle. The cycle is then repeated beginning with the filling of the injection chamber 63.

The system described provides much greater accuracy in the injection of a desired volume amount of plastic into a mold from chamber 63. Previous methods that depended on determining the position of the extremely fast moving piston 44 by timed operation or position sensors were subject to many inaccuracies due to only slight differences in the plasticity of the charges and the speed of the piston 44. Because the filling of accumulator 21 chamber 22 is at a relatively slow rate, the volume of hydraulic fluid placed in that chamber can be more precisely measured and controlled. In turn the volume of plastic injected into the mold is more precisely controlled because the volume of the hydraulic fluid injected into the injector cylinder 50 and thus the travel distance of ram 52/piston 44 is more precisely controlled.

Thus, there has been described a system for more precisely controlling the "charge" of volume of plastic injected into a mold in a high speed injection molding machine. Although only the presently preferred embodiment of the invention has been described, many changes and modifications still within the spirit of the invention will be apparent to those skilled in the art; therefore it is intended that the scope of the invention be limited only as set forth in the following claims.

What is claimed is:

1. The method of accurately controlling the travel distance of an injection piston in a high speed injection molding machine during the mold injection process comprising:

accumulating at a relatively slow rate under high pressure a precisely measured volume of hydraulic fluid and admitting substantially the entire amount of said precisely measured accumulated volume of hydraulic fluid under said high pressure into the injector cylinder driving said injection piston during each injection cycle of said molding machine.

2. The method of accurately controlling the travel distance of the injection piston of a high speed injection molding machine during the mold injection process comprising the steps of:

accumulating in a high pressure container at a relatively slow rate and under high pressure a precisely measured volume of hydraulic fluid and thereafter exhausting substantially all of said hydraulic fluid accumulated under high pressure in said container at a high rate into the injector cylinder of said high speed molding machine thereby driving said injection piston an exact predetermined distance in the injection cylinder.

3. The method defined in claim 2 wherein said precisely measured volume of fluid is collected by admitting the hydraulic fluid output from a fixed displacement pump to said pressure container for a predetermined period of time.

4. The method of claim 2 wherein said precisely measured volume of hydraulic fluid is accumulated within a fluid chamber separated from a gas chamber charged with gas under high pressure by a movable piston and the volume of fluid within said fluid chamber is determined by detecting the position of said movable piston.

5. The method of claim 4 wherein the position of said movable piston is detected by a linear position transducer.

6. In a high speed injection molding machine wherein a volume of hydraulic fluid is accumulated at a relatively slow rate under high pressure in a high pressure container and thereafter exhausted at a very high rate into an injector cylinder to drive an injection piston within an injection cylinder to eject the contents of the injection chamber of said injection cylinder into a mold at high speed, the improvement comprising:

control means operable during the relatively slow accumulation of said hydraulic fluid in said high pressure container to measure precisely the volume of said hydraulic fluid accumulated in said container and to halt said slow accumulation when the accumulated amount of said hydraulic fluid in said container has reached a predetermined precise volume; and valve means operable to exhaust substantially all of said predetermined precise volume of said hydraulic fluid from said container into said injector cylinder at high speed.

7. The improvement as defined in claim 6 wherein said control means comprises a fixed displacement pump means and timed valve means for permitting fluid inflow to said container from said pump for a predetermined period of time.

8. The improvement as defined in claim 6 wherein said high pressure container comprises a high pressure gas chamber and a fluid chamber separated from said gas chamber by a movable piston and said control means comprises inlet valve means controlled by a piston position detector.

9. The improvement defined in claim 8 wherein said piston position detector comprises a linear position transducer.

* * * * *